US011050973B1

(12) United States Patent
Faulkner et al.

(10) Patent No.: US 11,050,973 B1
(45) Date of Patent: Jun. 29, 2021

(54) DYNAMICALLY CONTROLLED ASPECT RATIOS FOR COMMUNICATION SESSION VIDEO STREAMS

(71) Applicant: MICROSOFT TECHNOLOGY LICENSING, LLC, Redmond, WA (US)

(72) Inventors: Jason Thomas Faulkner, Seattle, WA (US); Ruchir Astavans, Redmond, WA (US); Kevin Daniel Morrison, Arlington, MA (US); Timur Aleshin, Redmond, WA (US); Chad A. Voss, Redmond, WA (US); Amey Parandekar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/729,272

(22) Filed: Dec. 27, 2019

(51) Int. Cl.
*H04N 7/15* (2006.01)
*H04N 7/14* (2006.01)
(Continued)

(52) U.S. Cl.
CPC .......... *H04N 7/147* (2013.01); *H04L 65/403* (2013.01); *H04L 65/607* (2013.01); *H04N 7/0122* (2013.01); *H04N 7/152* (2013.01)

(58) Field of Classification Search
CPC ... H04N 7/15; H04N 7/14; H04N 7/01; H04L 29/06
(Continued)

(56) References Cited

U.S. PATENT DOCUMENTS 7,554,571 B1 6/2009 Beck et al.
8,350,891 B2 1/2013 Khot et al.
(Continued)

FOREIGN PATENT DOCUMENTS

NO 2016168154 A1 10/2016

OTHER PUBLICATIONS

"About Sync Settings on Windows 10 devices", Retrieved from: https://web.archive.org/web/20190906210836/https:/support.microsoft.com/en-us/help/4026102/windows-10-about-sync-settings, Retrieved Date: Sep. 6, 2019, 2 Pages.
(Continued)

*Primary Examiner* — Melur Ramakrishnaiah
(74) *Attorney, Agent, or Firm* — Newport IP, LLC; Scott Y. Shigeta

(57) ABSTRACT

The disclosed techniques improve user engagement and promote efficient use of computing resources by providing dynamically controlled aspect ratios for communication session renderings based on a physical orientation of a device. In some configurations, a system can select a first aspect ratio for individual video streams of a communication session when a device is in a first orientation, e.g., a portrait orientation. In addition, the system can select a second aspect ratio for the individual video streams when the device is in a second orientation, e.g., a landscape orientation. In some configurations, the first aspect ratio can be greater than the second aspect ratio, or the aspect ratios can be selected based on a target aspect ratio, which can be adjusted over time. By dynamically selecting an aspect ratio for individual stream renderings, screen space of a device can be optimized while the device is held in various physical orientations.

20 Claims, 10 Drawing Sheets

(51) Int. Cl.
*H04L 29/06* (2006.01)
*H04N 7/01* (2006.01)

(58) Field of Classification Search
USPC .................... 348/14.01–14.16; 715/753
See application file for complete search history.

(56) References Cited

U.S. PATENT DOCUMENTS

| | | | |
|---|---|---|---|
| 8,379,077 | B2 | 2/2013 | Wu et al. |
| 9,088,694 | B2 | 7/2015 | Navon et al. |
| 9,148,627 | B2 | 9/2015 | Anderson et al. |
| 9,369,672 | B2 | 6/2016 | Hiller et al. |
| 9,467,657 | B2 | 10/2016 | Decker et al. |
| 9,736,395 | B2 | 8/2017 | Ramon |
| 9,781,385 | B2 | 10/2017 | Ma et al. |
| 9,800,831 | B2 | 10/2017 | Diao |
| 9,819,877 | B1 | 11/2017 | Faulkner et al. |
| 9,876,989 | B2 | 1/2018 | Noy et al. |
| 10,321,093 | B2 | 6/2019 | Duckworth et al. |
| 10,362,272 | B1 | 7/2019 | Van et al. |
| 10,389,977 | B1 | 8/2019 | Van Os et al. |
| 2004/0012724 | A1 | 1/2004 | Jang |
| 2005/0259144 | A1 | 11/2005 | Eshkoli |
| 2007/0200923 | A1 | 8/2007 | Eleftheriadis et al. |
| 2007/0300165 | A1 | 12/2007 | Haveliwala |
| 2010/0002069 | A1 | 1/2010 | Eleftheriadis et al. |
| 2011/0093273 | A1 | 4/2011 | Lee et al. |
| 2011/0249074 | A1 | 10/2011 | Cranfill et al. |
| 2012/0062473 | A1* | 3/2012 | Xiao .............. H04N 5/76 345/173 |
| 2012/0249877 | A1* | 10/2012 | Hernandez Costa ............ H04N 21/4316 348/564 |
| 2013/0106988 | A1 | 5/2013 | Davis et al. |
| 2015/0092011 | A1 | 4/2015 | Zhan et al. |
| 2016/0308920 | A1* | 10/2016 | Brunsch ............ H04L 67/24 |
| 2018/0014049 | A1* | 1/2018 | Griffin ............ H04N 21/422 |
| 2018/0150433 | A1 | 5/2018 | Sowden et al. |
| 2018/0152737 | A1 | 5/2018 | Mathur et al. |
| 2018/0191965 | A1 | 7/2018 | Faulkner et al. |
| 2019/0043453 | A1 | 2/2019 | Wang |
| 2019/0342519 | A1 | 11/2019 | Van Os et al. |

OTHER PUBLICATIONS

"Changing Your Own Video Layout", Retrieved from: https://documentation.avaya.com/bundle/UsingXTSeries_r91/page/xt1000_ug_calls_changeVideoLayout.html, Retrieved Date: Sep. 17, 2019, 4 Pages.

"Using Dual Monitors with the Zoom Desktop Client", Retrieved from: https://support.zoom.us/hc/en-us/articles/201362583-Using-Dual-Monitors-with-the-Zoom-Desktop-Client?mobile_site=true, Retrieved Date: Sep. 17, 2019, 3 Pages.

"ViewSplit-Display Layout Software", Retrieved from: https://web.archive.org/web/20170318042724/https:/www.viewsonic.com/us/viewsplit.html, Retrieved Date: Mar. 18, 2017, 4 Pages.

"Non Final Office Action Issued in U.S. Appl. No. 16/743,391", dated Jul. 20, 2020, 10 Pages.

"Non-Final Office Action Issued in U.S. Appl. No. 16/729,255", dated Mar. 20, 2020, 10 Pages.

"Non-Final Office Action Issued in U.S. Appl. No. 16/729,286", dated Apr. 6, 2020, 10 Pages.

"International Search Report and Written Opinion Issued in PCT Application No. PCT/US20/059254", dated Feb. 2, 2021, 18 Pages.

Girgensohn, Andreas, "A Fast Layout Algorithm for Visual Video Summaries", In Proceedings of the Internationa conference on Multimedia and Expo, vol. 2, Jul. 6, 2003, pp. 77-80.

"International Search Report and Written Opinion Issued in PCT Application No. PCT/US20/061145", dated Feb. 25, 2021, 15 Pages.

"International Search Report and Written Opinion Issued in PCT Application No. PCT/US20/061149", dated Feb. 24, 2021, 12 Pages.

"International Search Report and Written Opinion Issued in PCT Application No. PCT/US20/062469", dated Feb. 17, 2021, 15 Pages.

* cited by examiner

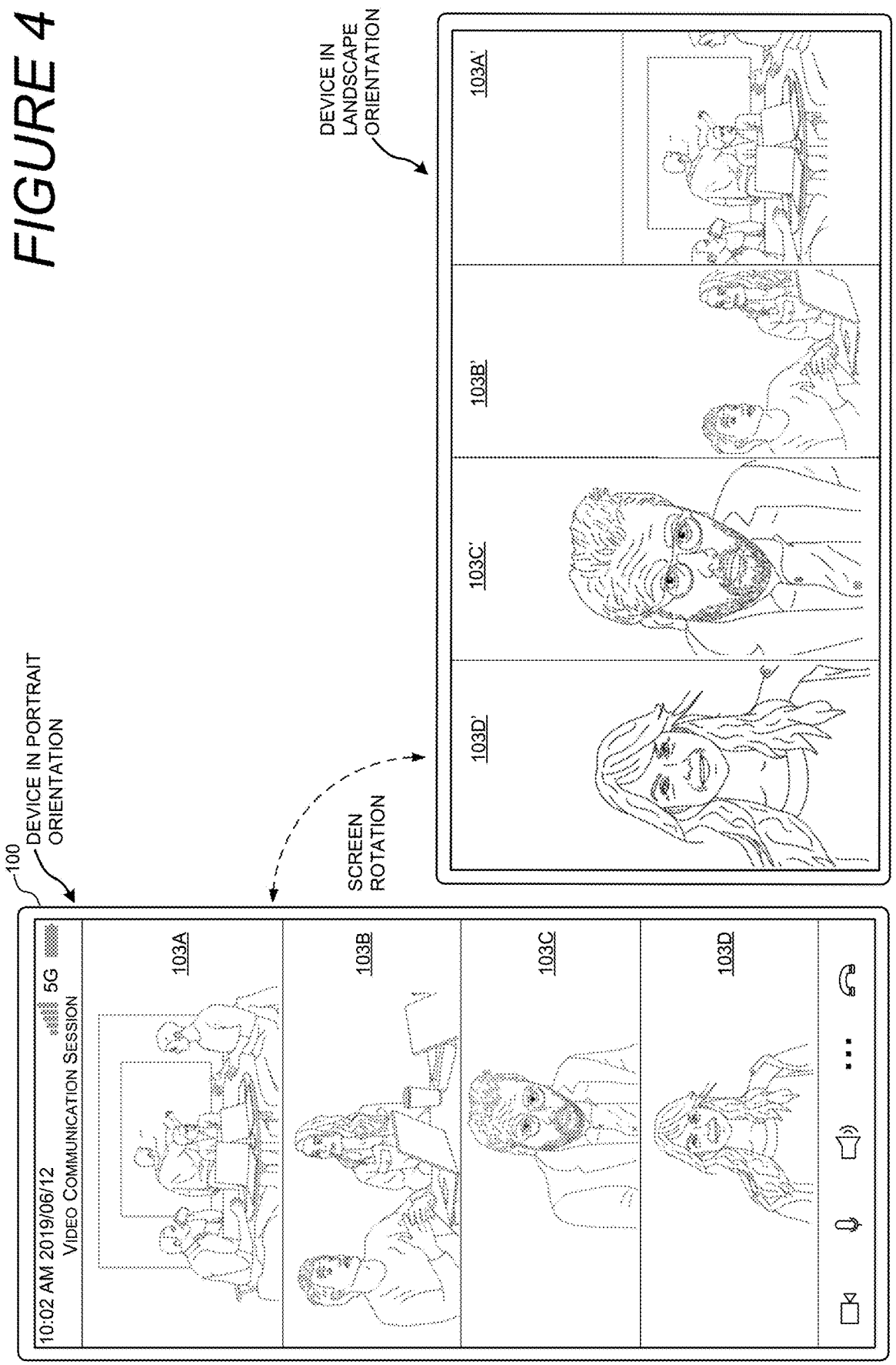

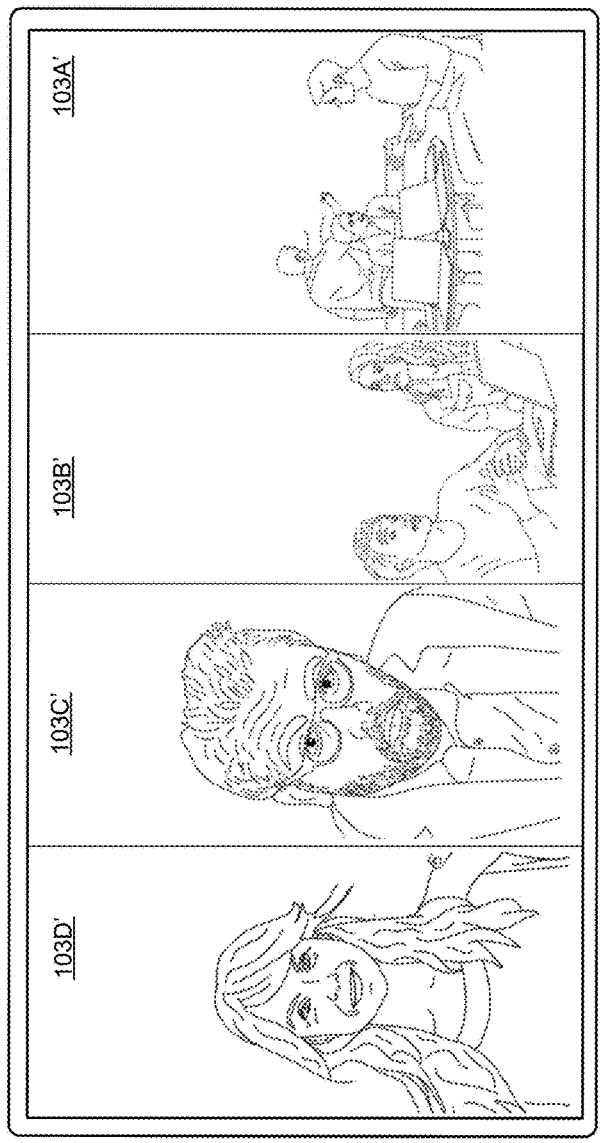
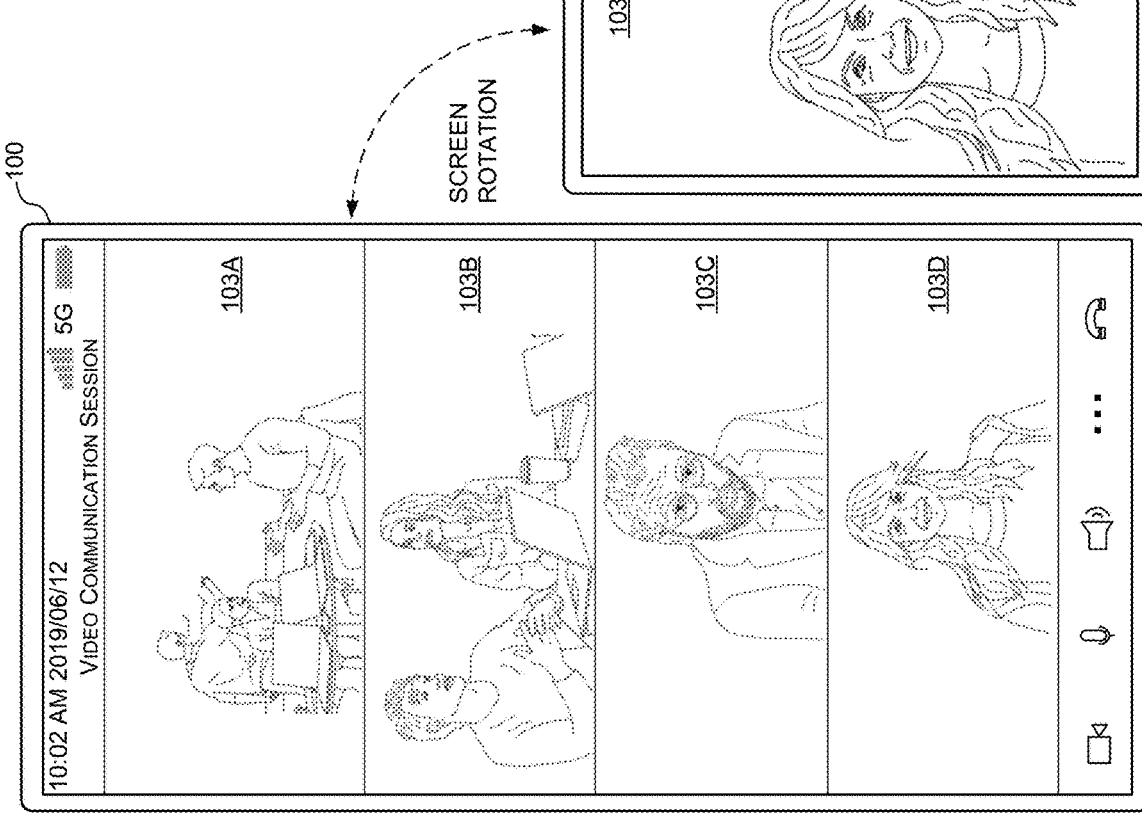
FIGURE 5A

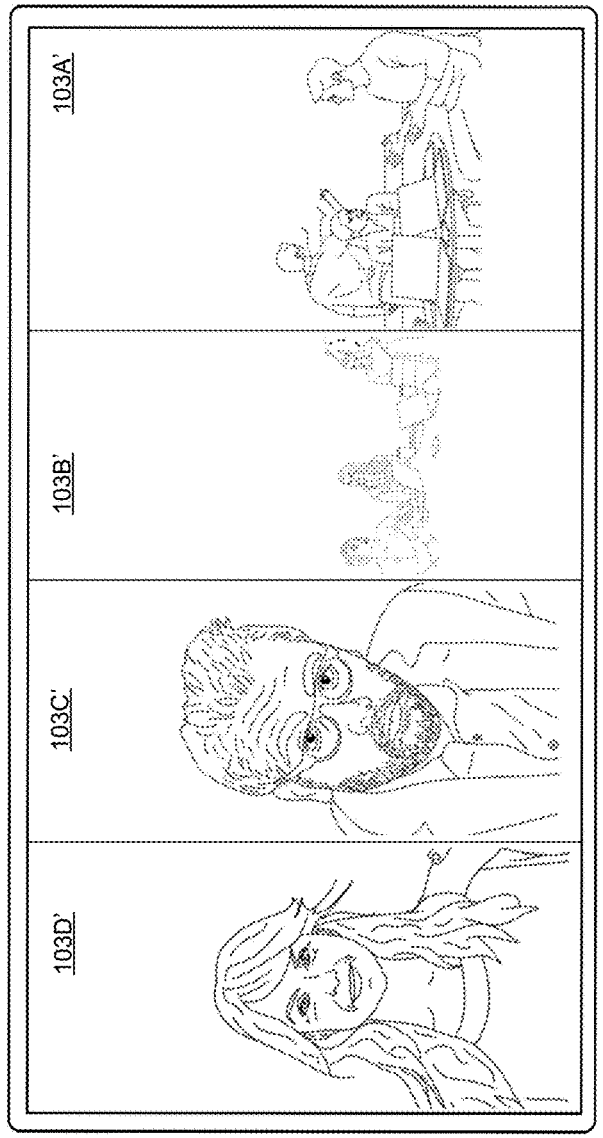
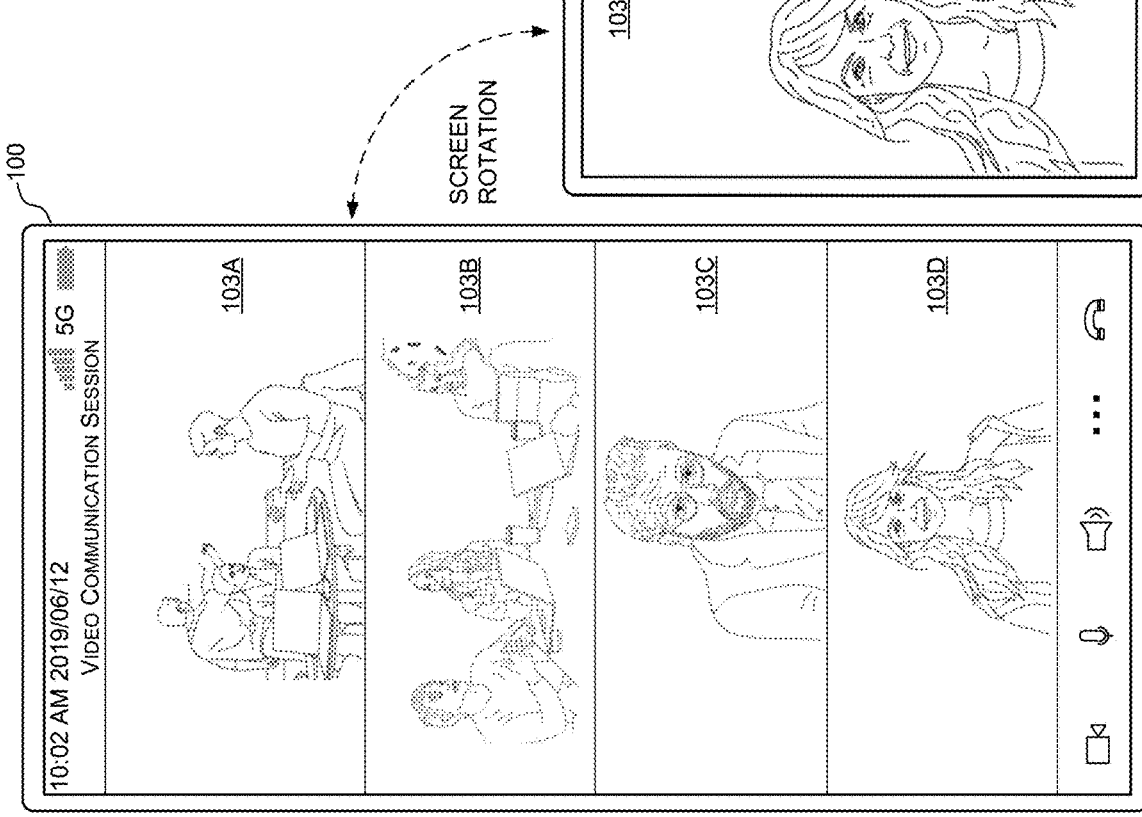
FIGURE 5B

DYNAMICALLY CONTROLLED ASPECT RATIOS FOR COMMUNICATION SESSION VIDEO STREAMS

BACKGROUND

There are a number of different communication systems that allow users to collaborate. For example, some systems allow people to collaborate by the use of live video streams, live audio streams, and other forms of text-based or image-based mediums. Participants of a communication session can share a video stream showing a single person or a group of people with a display of shared content. Such systems can provide participants of a communication session with an experience that simulates an in-person meeting.

Although there are a number of different types of systems that allow users to collaborate, some existing systems have a number of shortcomings. For example, when an on-line meeting includes a number of video streams, most existing systems display each stream in a fixed arrangement. Such designs usually include a grid pattern, where each rendering has a fixed size and shape. Such designs can also lead to a scenario where some video streams are not optimally displayed to a viewer. For instance, when a mobile device is held in one orientation, e.g., an upright portrait orientation, each video stream may be rendered using a fixed aspect ratio. When the device is rotated, e.g., rotated from a portrait orientation to a landscape orientation, each video rendering may be rearranged and resized but kept at the same fixed aspect ratio. Such designs may not optimally utilize the screen space for each orientation. A collection of stream renderings having a fixed aspect ratio may work for one set of screen dimensions, e.g., when in a portrait orientation, but not work for another set of screen dimensions, e.g., when in a landscape orientation.

In addition, when a device rearranges renderings of multiple video streams, the movement of multiple video streams may be distracting to users if the movement of each rendering is not conducted in an orderly fashion. In addition, when renderings are resized, such adjustments may partially cut some users out of a rendering, particularly when users are in a multi-person video stream. Such design issues may not optimally promote user engagement since a viewer may not be able to clearly see each person, track the progress of one stream, or see important gestures performed by each person.

Software applications that do not promote user engagement can lead to production loss and inefficiencies with respect to computing resources. For instance, participants of a communication session, such as an online meeting, may need to refer to recordings or other resources when content is missed or overlooked. Content may need to be re-sent when users miss salient points during a live meeting. Such activities can lead to inefficient use a network, processor, memory, or other computing resources. Also, when a participant's level of engagement is negatively impacted during a meeting, such a loss of production may cause a need for prolonged meetings or follow-up meetings, which in turn take additional computing resources. Such production loss and inefficiencies with respect to computing resources can be exacerbated when a system is used to provide a collaborative environment for a large number of participants.

In addition to a loss in user engagement, a number of other inefficiencies can result when communication systems do not effectively display a live video of a person or shared content. Participants can miss important social cues, e.g., when a person raises their hand, begins to speak, looks in a certain direction, etc. Such shortcomings sometimes require users to manually interact with others by the use of separate communication systems. For example, some users still send text messages or emails to other participants while in a conference call if a cue was missed or if some type of miscommunication is suspected. Such manual steps can be disruptive to a person's workflow and highly inefficient when it comes to helping a person establish a collaboration protocol with a group of people. Such drawbacks of existing systems can lead to loss of productivity as well as inefficient and redundant use of computing resources.

SUMMARY

The techniques disclosed herein improve user engagement and more efficient use of computing resources by providing dynamically controlled aspect ratios for communication session renderings based on a physical orientation of a device. In some configurations, a system can select a first aspect ratio for individual video streams of a communication session when a device is in a first orientation, e.g., a portrait orientation. In addition, the system can select a second aspect ratio for the individual video streams when the device is in a second orientation, e.g., a landscape orientation. In some configurations, the first aspect ratio can be greater than the second aspect ratio. In other configurations, the first aspect ratio can be greater than a target aspect ratio, and the second aspect ratio can be less than the target aspect ratio. For example, when a device is in an upright orientation, e.g., when the screen is in a portrait orientation, individual streams can be displayed using an aspect ratio greater than a target aspect ratio of one (1:1). Thus, renderings may be displayed at an aspect ratio of 4:3, 16:9, etc. When the device is in a second orientation, e.g., when the screen is in a landscape orientation, individual streams can be displayed using an aspect ratio less than the target aspect ratio of one (1:1), e.g., renderings can be displayed at an aspect ratio of 3:4, 5:9, etc. In some embodiments, the target aspect ratio can be selected based on one or more factors, including an aspect ratio of a display screen, a number of participants depicted in a video stream, etc. In other embodiments, a target aspect ratio may include a range, e.g., 3:4 to 4:3. Thus, in some embodiments, a device can select a first aspect ratio that is greater than the range when the device is in a portrait orientation or select a second aspect ratio that is less than the range when the device is in a landscape orientation. By dynamically selecting an aspect ratio for individual stream renderings, which, in some embodiments, can be based on a target aspect ratio, the screen space can be optimized while a device is held in various physical orientations.

In some configurations, the device may select a fixed aspect ratio for a first set of streams depicting a threshold number of people, and an aspect ratio that can be adjusted based on the orientation of the device for a second set of streams depicting less than the threshold number of people. In one example, a system can select a fixed, wide aspect ratio for video streams depicting a threshold number of people and maintain that wide aspect ratio when the device transitions to different physical orientations. While select renderings have a fixed aspect ratio, the renderings for the single-person (e.g., fewer than a threshold number of people) video streams can be adjusted according to an orientation of a device. By affixing an aspect ratio for stream renderings depicting a threshold number of people while adjusting aspect ratios of other streams, the screen space can be further optimized while a device is held in various physical orientations.

In some configurations, a system can analyze streams of a communication session and select streams having a threshold number of people. The system may further analyze the selected streams to identify an individual having a threshold level activity. The system may then scale the image to zoom into the individual having the threshold level activity. This is an improvement over existing systems that typically involve rigid user interface arrangements for mobile devices. One benefit of the presently disclosed techniques is to make active people depicted in a multi-person video stream appear to be the same size as people depicted in single-person video streams. This adjustment in the size of select streams while adjusting aspect ratios of other streams helps a system provide more control of a display arrangement to equalize the representation of each person displayed within a user interface.

The features disclosed herein help promote user engagement for presenters and viewers by making the actions of each person in a multi-person video easier to visualize, and in some embodiments, equalize the display of people in a multi-person video with the display of people in single-person video streams. The techniques can also apply to any identified object within a video stream, as the techniques are not just limited to identifying the number of people depicted in a video stream.

The examples described herein are provided within the context of collaborative environments, e.g., private chat sessions, multi-user content editing sessions, group meetings, live broadcasts, etc. For illustrative purposes, it can be appreciated that a computer managing a collaborative environment involves any type of computer managing a communication session where two or more computers are sharing video data, both recorded and live video streams. In addition, it can be appreciated that the techniques disclosed herein can apply to any user interface arrangement that is used for displaying content. The scope of the present disclosure is not limited to embodiments associated with collaborative environments.

The techniques disclosed herein provide a number of features that improve existing computers. For instance, computing resources such as processor cycles, memory, network bandwidth, and power, are used more efficiently as a system can dynamically control the size, position, and shape of video streams. By providing user interfaces having dynamically controlled aspect ratios for individual streams based on a physical orientation of a device, a user interface can provide more visual details of objects of interest. Thus, the techniques disclosed herein can provide more efficient use of computing resources by providing a user interface that optimizes user engagement.

The techniques disclosed herein provide a number of features that improve existing computers. For instance, computing resources such as processor cycles, memory, network bandwidth, and power, are used more efficiently as a system can dynamically control the size, position, and shape of video streams depicting a threshold number of people. By providing dynamically controlled user interfaces that provide more visual details for objects of interest, the techniques disclosed herein can provide more efficient use of computing resources. The system can improve user interaction with a computing device by mitigating the need for additional communication systems, as the disclosed system can mitigate or eliminate the need for requests for content to be re-sent, repeated, etc. Improvement of user interactions with a device can also lead to the reduction of unnecessary or redundant input, which can mitigate inadvertent inputs, corrected inputs, and other types of user interactions that utilize computing resources. Other technical benefits not specifically mentioned herein can also be realized through implementations of the disclosed subject matter.

Those skilled in the art will also appreciate that aspects of the subject matter described herein can be practiced on or in conjunction with other computer system configurations beyond those specifically described herein, including multiprocessor systems, microprocessor-based or programmable consumer electronics, augmented reality or virtual reality devices, video game devices, handheld computers, smartphones, smart televisions, self-driving vehicles, smart watches, e-readers, tablet computing devices, special-purpose hardware devices, networked appliances, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4 illustrates aspects of a device for configuring a user interface arrangement based a physical orientation of the device and a number of people depicted in multiple renderings of multiple video streams.

FIG. 5A illustrates a first state of two user interface arrangements based on a number of people depicted in two or more video streams.

FIG. 5B illustrates a change with respect to a number of people depicted in a video stream received by a device.

DETAILED DESCRIPTION

The following Detailed Description is directed to techniques for improving user engagement and more efficient use of computing resources by providing dynamically controlled aspect ratios for renderings of video streams of a communication session based on a physical orientation a display screen of a device. In some configurations, a system can control the dimensions, size, and position of multiple video renderings based on a number of factors including but not limited to a physical orientation of a display screen, a number of individuals depicted in a video stream, and/or an activity level of people depicted in one or more video streams. Additional details of a system for determining an order in which streams are arranged are described herein.

Figure 1:
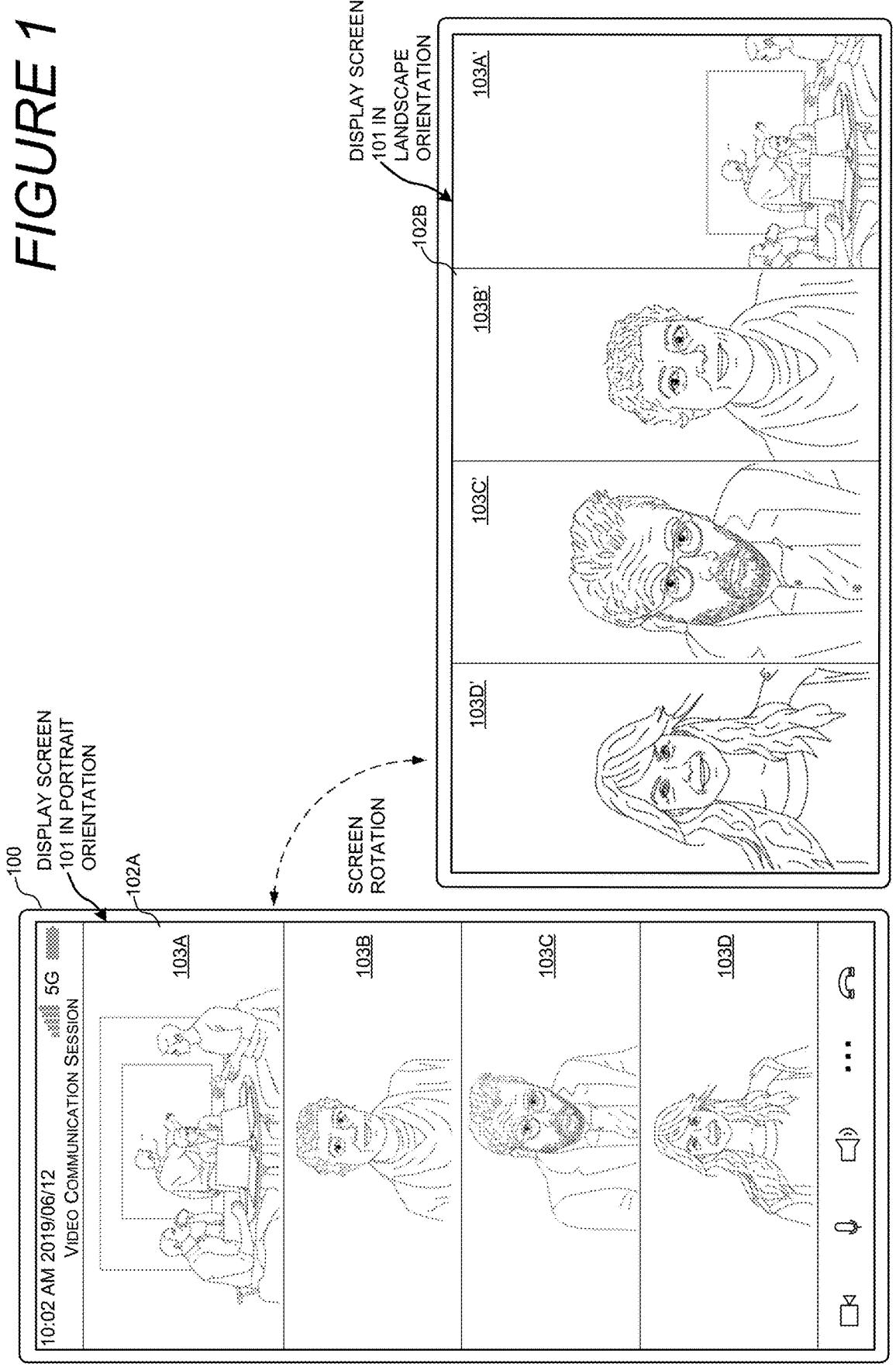
FIG. 1 illustrates aspects of a device for configuring a user interface arrangement based a physical orientation of the device.

FIG. 1 illustrates aspects of a device 100 for configuring a user interface arrangement having renderings with specific aspect ratios based on a physical orientation of a display screen of the device 100. The device 100 can receive streams from a server. The server can manage a number of data streams having a video component and an audio component allowing the device 100 to communicate with a number of other remote devices. Additional details of the server managing communication sessions between the device 100 and other remote devices are provided below with reference to the system 602 shown in FIG. 7. Additional aspects of the device 100 are also described in more detail below with reference to the devices 606 shown in FIG. 7.

In some configurations, the device 100 (also referred to herein as a "computing system 100") can receiving a number of streams that each include a video component. The device 100 can also receive orientation data from a sensor mounted to the device 100. Additional details regarding the sensor is provided below with respect to FIG. 7. The orientation data can indicate that a display screen 101 of the computing system 100 is in a portrait orientation or a landscape orientation. In response to determining that the display screen 101 is in the portrait orientation, the device 100 can cause a display of a first user interface arrangement 102A comprising individual renderings 103 (individually referenced as 103A-103D) of individual streams received by the device 100. While in the portrait orientation, the device can select a first aspect ratio that is greater than a target aspect ratio. For example, the target aspect ratio can be 1:1 (value of 1). In such an example, the first aspect ratio can be any aspect ratio greater than a value of 1, e.g., a landscape dimension such as 16:9, 4:3, etc. As shown in the example of FIG. 1, with a given target aspect ratio of one (1) and since the device is in a portrait orientation, the aspect ratio of each rendering 103A-103D has a landscape dimension, e.g., 16:9.

As shown in FIG. 1, during operation, the device 100 can also receive additional orientation information from the sensor. The device 100 can monitor the orientation of the device, or the orientation of the display 101 of the device, and in response to determining that the display screen 101 transitioned from the portrait orientation to a landscape orientation, the device 100 can invoke a transition from the first user interface arrangement 102A to a display of a second user interface arrangement 102B comprising updated renderings 103' (individually referenced as 103A'-103D') of the individual streams, wherein the updated renderings 103 each have a second aspect ratio that is less than the target aspect ratio. In some configurations, the second aspect ratio can be less than the first aspect ratio. Thus, in some configurations, a target aspect ratio or a target aspect ratio range may not be utilized.

The selection of the target aspect ratio can be based on one or more factors. For example, the target aspect ratio or the selected target ratios can be based on the dimensions of an allocated display area. An allocated display area may be a display area that is designated within one or more display screens. For instance, an allocated display area may be a specified display area spanning across multiple display devices or a specified display area of a portion of a single display device. In one illustrative example, selected aspect ratios can be selected based on one or more dimensions of a display device in communication with computing system. Thus, if a display screen has a 16:9 display area, the target aspect ratio or the selected aspect ratios can include values that are divisible by at least one dimension of the display screen. In this example, an aspect ratio for the device in portrait orientation can be 9:4, and an aspect ratio for the device in landscape orientation can be 4:9.

In another illustrative example, a target aspect ratio can be selected based on a preferred layout for the dimensions of a particular display device. For example, a user may set a target aspect ratio of one (1:1) if the user prefers to have landscape renderings when their device is in a portrait orientation, and portrait renderings when their device is in a landscape orientation. However, the target aspect ratio can be adjusted to a higher value, e.g., 4:3, if they wish to bias each aspect ratio to a wider configuration for both the portrait orientation and the landscape orientation. Similarly, the target aspect ratio can be adjusted to a lower value, e.g., 3:4, if they wish to bias each aspect ratio to a narrower configuration for both the portrait orientation and the landscape orientation.

In some a target aspect ratio may include a range of aspect ratios. For instance, a target aspect ratio may include a range from 3:4 to 4:3. Thus, the target aspect ratio can be used to select a first aspect ratio above the range and a second aspect ratio below the range. Such an embodiment enables a device to have more granular control over each user interface arrangement used in each orientation.

Figure 2:
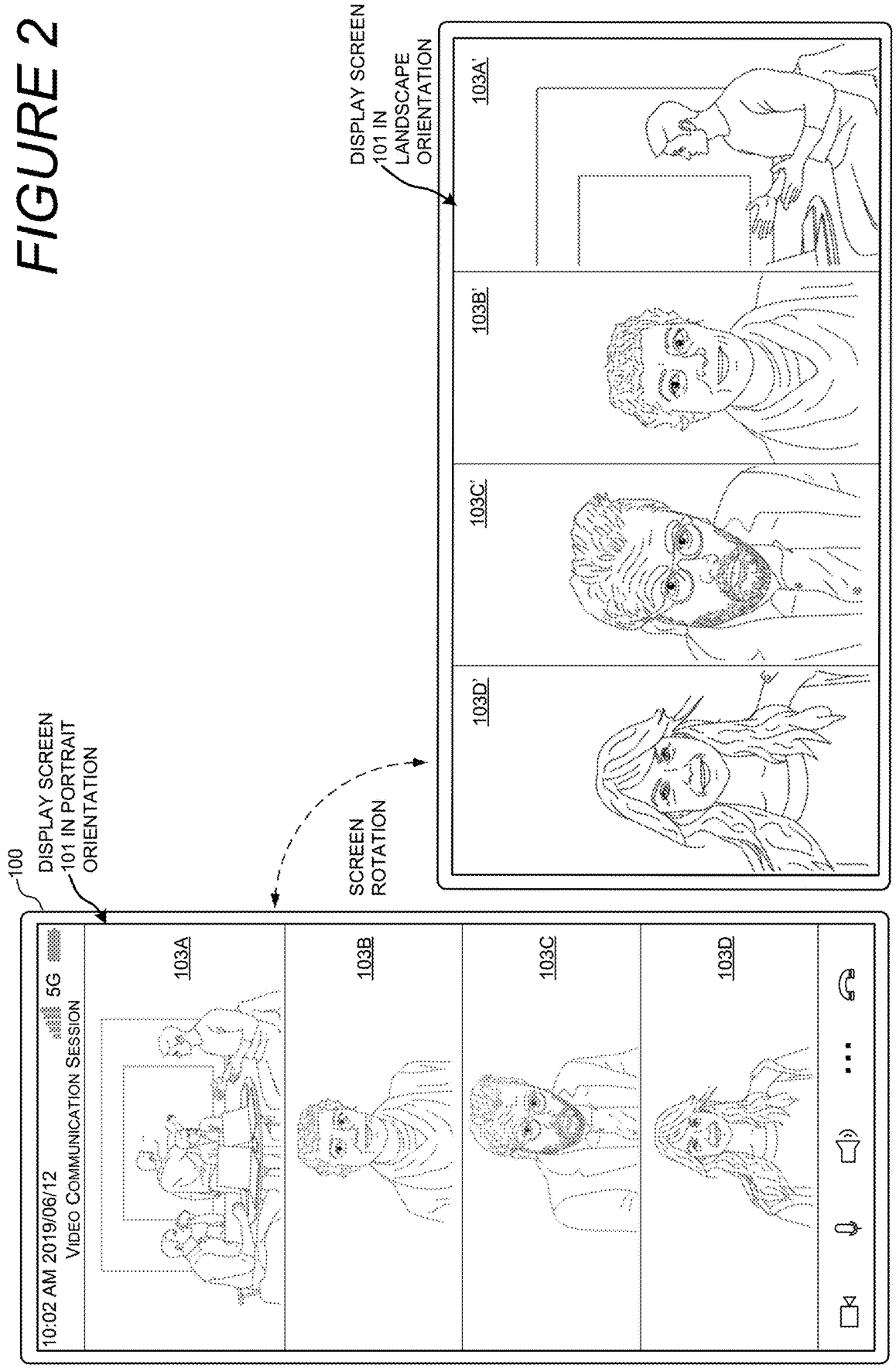
FIG. 2 illustrates aspects of a device for configuring a user interface arrangement based a physical orientation of the device and activity of at least one user depicted in a rendering of a video stream.

Referring now to FIG. 2, aspects of an embodiment for configuring a user interface arrangement based a physical orientation of the device and an activity level of at least one stream is shown and described below. In some configurations, individual aspect ratios can be applied to select streams based on the presence of a one or more criteria being met with respect to activity of a video component or audio component of a stream. FIG. 2 illustrates aspects of an embodiment for configuring a user interface arrangement based a physical orientation of the device and activity of at least one stream received by the device 100. In this example, once the device determines that the display screen 10 when is in landscape orientation, a scaling factor is determined for one or more select streams depicting a threshold number of people. For illustrative purposes, the first rendering 103A generated from a first stream has a video component depicting four people. If the device 100 receives configuration data defining a threshold of three (3) people, the device would select the rendering of the first stream for a modified scaling factor.

The scaling factor can be selected based on the size of a person having a threshold level of activity. For instance, if a person within a video is speaking at a threshold rate, speaking at a threshold volume, or performing gestures that meet one or more criteria, a scaling factor can be selected to enable the device to focus a rendering 103A' of a stream on that person, as shown in FIG. 2. The system can continue monitoring the activity of a video component or an audio component of a stream having a threshold number of people. Thus, if a first person has a threshold level of activity and later stop or reduced that activity, and then a second person started a threshold level of activity, the device may focus the rendering of that stream on the second person and thus change the scaling factor to accommodate the display of the second person.

In some configurations, a unique scaling factor can be applied to individual renderings of each stream. A scaling factor can be selected for each stream to equalize at least one dimension of a physical feature of two or more people depicted in different streams. One dimension can include a width and/or height of a person's face, head, crown or any other dimension that can be measured by an analysis of a video image of a person. For instance, consider a scenario where a first rendering depicts two people and a second rendering depicts one person. In this example, without the application of a scaling factor, the renderings show that the people in the two-person video appear to be smaller, e.g., half the size as the person in the single-person video. In an effort to equalize the size of the display of each person, a scaling factor can be selected to increase the size of the rendering, which may include cropping edges from the image, of the two-person video. In addition, or alternatively, another scaling factor can be selected to reduce the size of the rendering of the single-person video.

In some configurations, a scaling factor for each video can be selected based on the number of people depicted in each video. The selection of the scaling factors can be linear or non-linear. For instance, a two-person video may be scaled up by two times, and a three-person video can be scaled up by three times, etc. Alternatively, a two-person video may be scaled up by 1.75 times the size, and a three-person video can be scaled up by 2.15 times the size, etc. In another embodiment, a scaling factor for each video can be selected based on dimension of at least one physical feature of a depicted person. For instance, if one person in a two-person video has a measurement of 2 units of measure from the top of their head to their chin, and a person in a one-person video has a measurement of 4 units of measure from the top of their head to their chin, the two-person video may be scaled up by a factor of two. Other scaling factors may be selected based on the measurements depending on a desired outcome. By equalizing, or at least partially equalizing, at least one dimension of individual users depicted in each stream, the system can help improve user engagement by allowing viewers see details of displayed gestures and mitigating any visual favoritism that can result from people being displayed at different sizes.

In one illustrative example, a device may analyze a number of incoming streams to determine that at least one stream of the plurality of streams depicts a threshold number of people. The device can then analyze the identified stream depicting the threshold number of people to identify at least one person associated with a threshold level of activity. The device can then determine a scaling factor suitable for generating a modified rendering of the at least one stream, where the scaling factor of the modified rendering is configured to bring focus to the at least one person associated with the threshold level of activity. Brining focus to the one person can include both panning and zooming to a portion of a video rending depicting the one person.

Figure 3:
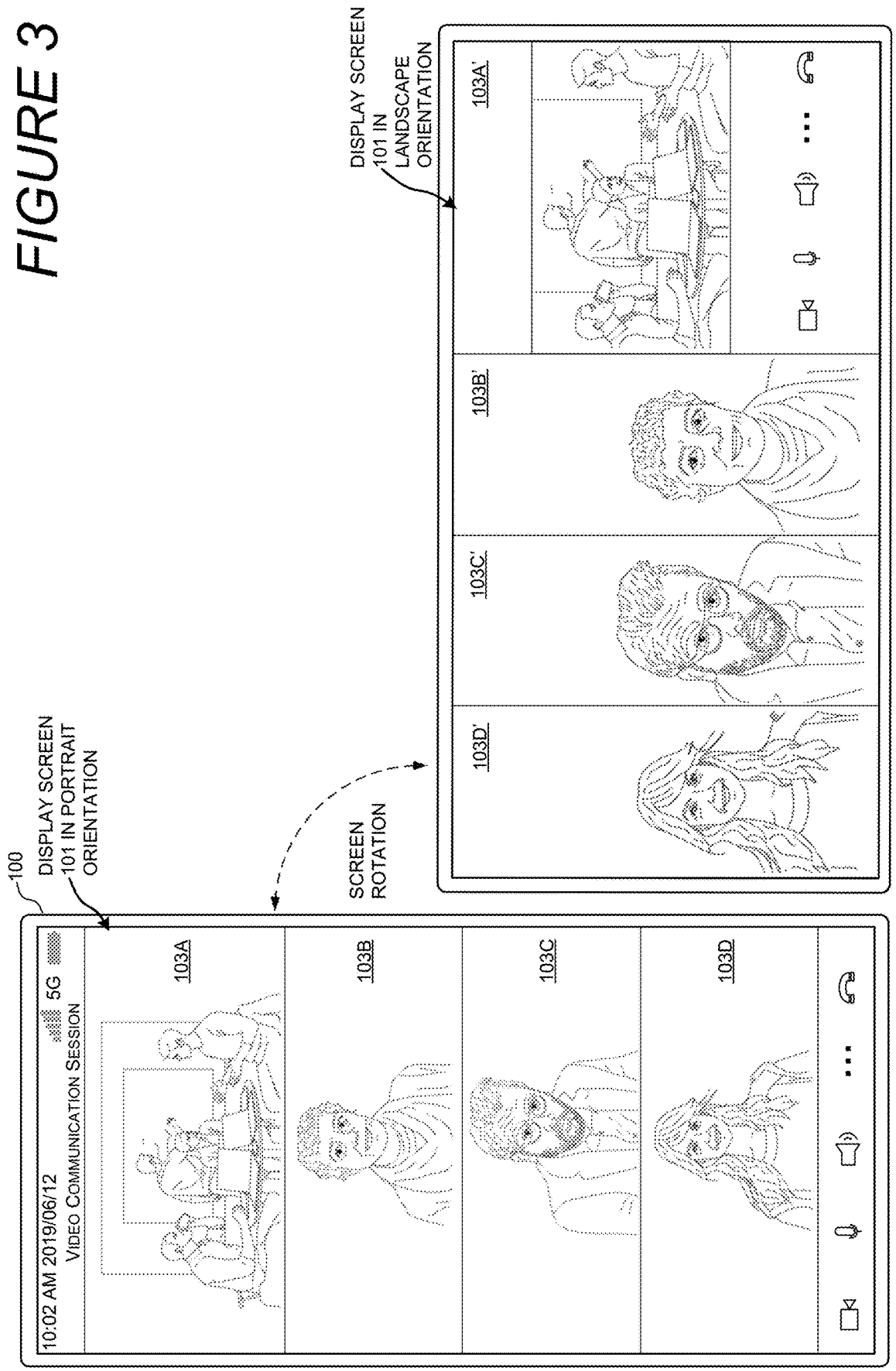
FIG. 3 illustrates aspects of a device for configuring a user interface arrangement based a physical orientation of the device and a number of people depicted in a rendering of a video stream.

Referring now to FIG. 3, other embodiments of the device are shown an described. In some configurations, the aspect ratio of one or more particular renderings may be fixed while the aspect ratio of other renderings are configured to change with the orientation of the device. In one illustrative example, an aspect ratio may be fixed for renderings that depict a threshold number of people. The aspect ratio for renderings that do not depict a threshold number of people may change depending on the orientation of the device. Aspects of such an embodiment is shown in FIG. 3. As shown, the first rendering 103A depicts four people. If configuration data indicates a threshold of three people, for example, and the device is rotated, the aspect ratio associated with the content of the first rendering 103A may be fixed. Thus, as shown, when the display screen 101 is in portrait orientation, all of the renderings 103A-103B are displayed using an aspect ratio that is greater than target aspect ratio, e.g., the renderings 103A-103B are displayed using a landscape view.

Then, when the device 100 is rotated such that the display screen 101 is in a landscape orientation, the updated rendering 103A' is displayed using the same aspect ratio as the first rendering 103A since the aspect ratio is fixed for this content. Also shown, the aspect ratios for the other renderings (103B-103D) are reduced to an aspect ratio less than the original aspect ratio, or reduced below a target aspect ratio, when the device 100 is rotated.

In one illustrative example, a device can analyze a number of incoming streams to determine that at least one stream of the plurality of streams depicts a threshold number of people. In response to determining that the at least one stream of the plurality of streams depicts the threshold number of people, e.g., 3 or 4 people, the device select a fixed aspect ratio for the at least one stream. The fixed aspect ratio can be configured to override any association between the identified stream and the second aspect ratio and the second aspect ratio. Thus, a rendering of the at least one stream is displayed using the fixed aspect ratio when the display screen is in the portrait orientation or the landscape orientation.

Referring now to FIG. 4, an embodiment where the renderings of individual streams are ordered based on the number of people depicted in the streams is shown and described below. In this embodiment, if a first stream depicts four people, a second stream depicts two people, and a third stream depicts one person, a device would configure a user interface arrangement ordering the streams from top to bottom as: the first stream, the second stream, and the third stream. Such an arrangement helps viewers stay focused on streams having a particular concentration of activity.

This example is provided for illustrative purposes and is not to be construed as limiting. Although the example described herein orders the renderings based on the number of people from top to bottom, it can be appreciated that the order can be arranged from bottom to top, left to right, right to left, or any other ordered configuration. It can also be appreciated that the order in which renderings are arranged can be based on other factors, such as a level of activity, e.g., a volume or rate in which a person is speaking or the performance of a particular gesture. In such an embodiment, and activity level may be generated for each stream, and the rendering of each stream may be ordered within a user interface arrangement 102 based on the activity level.

The techniques disclosed herein can utilize any suitable technology for analyzing a number of communication streams to determine a number of people depicted in one or more video components. For instance, facial recognition, pattern recognition, or movement recognition technologies can be utilized to determine a number of people depicted in the video components of each stream. Alternatively, a remote computer can analyze one or more streams to determine a number of people depicted in the video components of each stream and provide the number of depicted people in each stream by communicating the results to the device. The device can then configure the first user interface arrangement or the second user interface arrangement to order individual renderings of each stream based on the number of people depicted in the video components of each stream. An order from a highest to a lowest number of participants can be arranged from left to right, right to left, top to bottom, or bottom to top of a user interface. The order may also follow any other linear path defined within the user interface.

Figure 5C:
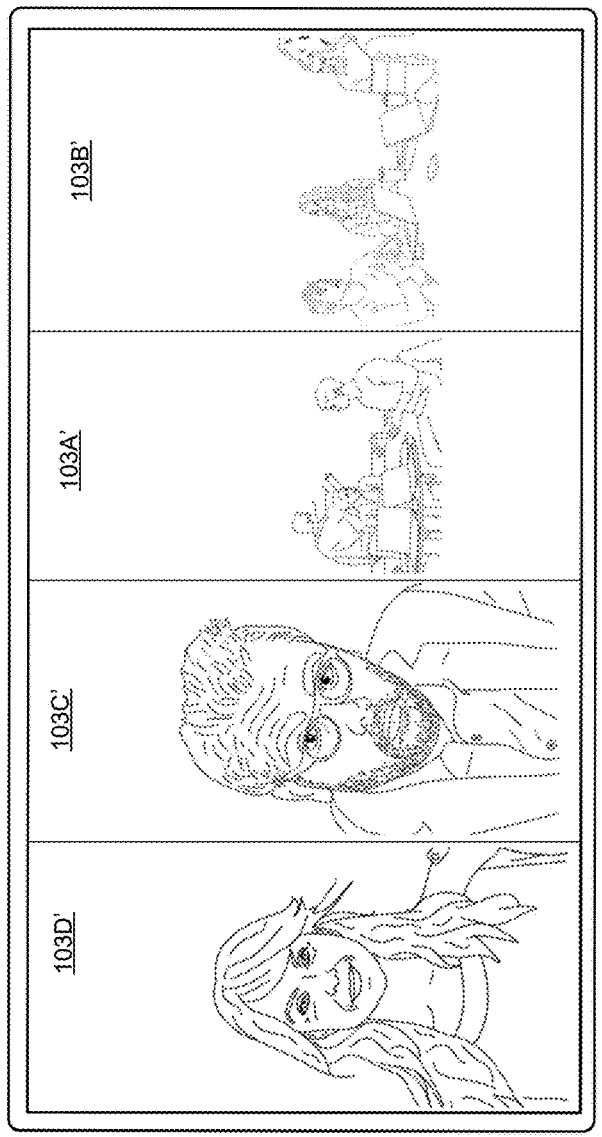
FIG. 5C illustrates a second state of two user interface arrangements based a detection of a change with respect to a number of people depicted in a video stream received by a device.

FIGS. 5A-5C illustrate another example of a user interface that can be arranged based on the physical orientation of a device and a number of people depicted in each stream. In some embodiments, a device can continually monitor the number of people depicted in each stream and change the order of each stream as the number of people change within each stream. FIG. 5A shows that a rendering 103A of the first stream includes three people and that a rendering 103B the second stream includes two people. As a result of the number of people depicted in each stream, when the device is in portrait orientation, the rendering of the first stream is displayed in the top position and the rendering of the second stream is displayed in the second position from the top position. When the device is in landscape orientation, the rendering of the first dream is displayed on the left position and the rendering of the second stream is displayed in the second position from the left position.

As the contents of the second stream changes, e.g., the second stream has a video component that shows an increasing number of people, the device may detect such changes and modify the order in which the renderings are displayed. As shown in FIG. 5B, the content of the second stream has changed such that the second rendering shows four people. Since the second stream now depicts more people than the first stream, the order in which the streams are rendered is changed, as shown in FIG. 5C. As shown, in response to the detected change, the second stream depicts more than the first stream, when the device is held in the portrait orientation, the rendering 103A of the first stream moved to the second position from the top and the rendering 103B of the second stream is moved to the top position. Also, in response to the detected change, when the device is held in the landscape orientation, the rendering 103A of the first stream is moved to the second position from the left and the rendering 103B of the second stream is moved to the left position.

In one illustrative example, a device can analyze a plurality of streams to determine a number of people depicted in the video components of each stream. The device can configure the first user interface arrangement or the second user interface arrangement to position a rendering of a first stream at one end of a sequence of renderings of the plurality of streams and position a rendering of a second stream at a second position of the sequence of renderings. The sequence can be a line of renderings, an ordered list arranged in rows and columns, etc. In this example, the number of people depicted in the first stream is greater than a number of people depicted in the second stream, a shown in FIG. 5A.

The device can continue monitoring the streams and determine if the number of people in each stream changes. If the number of people depicted in the first stream changes or the number of people depicted in the second stream changes, where the number of people depicted in the first stream becomes is less than the number of people depicted in the second stream, the device can reconfigure the order in which the renderings are positioned in each user interface arrangement. Thus, in response to determining when the number of people depicted in the first stream becomes less than the number of people depicted in the second stream, the device can configure the first user interface arrangement or the second user interface arrangement to move the rendering of the second stream at one end of the sequence of renderings and position the rendering of the first stream at the second position of the sequence of renderings.

Figure 6:
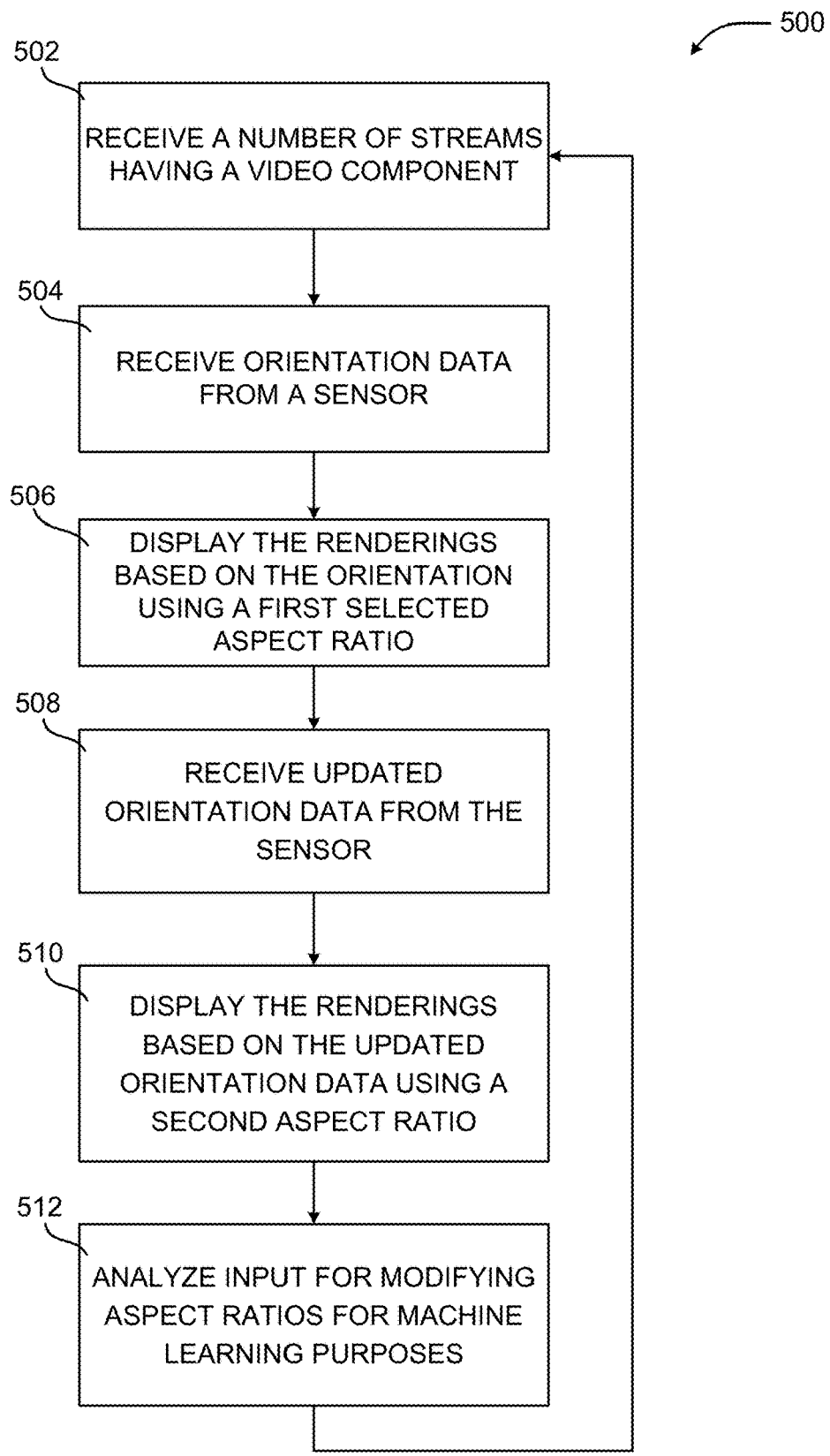
FIG. 6 is a flow diagram illustrating aspects of a routine for computationally efficient generation of a user interface arrangement.

FIG. 6 is a diagram illustrating aspects of a routine 500 for improving user engagement and more efficient use of computing resources by providing dynamically controlled aspect ratios for video stream renderings. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 6 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 500 starts at operation 502, where one or more computing modules receive a plurality of streams. As described in more detail below, with respect to FIG. 7, a system can manage a number of streams received from a number of different client devices. The streams can be bundled and communicated to individual computing devices, which may be used to display different arrangements of each stream. Each stream may comprise an audio component and a video component.

Next, at operation 504, one or more computing modules can receive orientation data from a sensor mounted to the computing device. The orientation data can indicate that a display screen 101 of the computing device 100 is in a portrait orientation or in landscape orientation. As described in more detail below, with respect to FIG. 7, a sensor may include an accelerometer, a compass or any other device for detecting a physical orientation of a device, e.g., whether device is positioned in an upright position, e.g., a portrait orientation, or a sideways position, e.g., a landscape orientation.

Next, at operation 506, one or more computing modules can cause a display of a first user interface arrangement 102A comprising individual renderings 103 of individual streams of the plurality of streams. The individual renderings can each have a first aspect ratio that is greater than a target aspect ratio in response to determining that the display screen 101 is in the portrait orientation. For example, individual renderings can each have a first aspect ratio forming a landscape dimension, 16:9, which is greater than a target aspect ratio, such as 1:1. It can be appreciated that other target aspect ratios may be selected to provide different outcomes with respect to each layout. In addition, a target aspect ratio may be selected based on a particular dimension of a screen, a model of a device, or other factors. Any target aspect ratio can be selected based on a desired outcome. For illustrative purposes, aspect ratios are deemed to be greater or less than one another. Such comparisons can be based on each number of an aspect ratio to be respectively a numerator and a denominator of a fraction to derive a value. For example, an aspect ratio of 4:3 has a value of 1.33 which is greater than an aspect ratio of 1:1 having a value of 1.00.

In some embodiments, the first aspect ratio and a second aspect ratio are respectively based on a first target aspect ratio and a second target aspect ratio. The first target aspect ratio and the second target aspect ratio can be collectively referred to herein as a target aspect ratio range or a "range." The first target aspect ratio can be referred to herein as a low end of the range and a second target aspect ratio can be referred to herein as a high end of the range. For instance, a target aspect ratio range may include a range from 3:4 to 4:3. Thus, a device may select a first aspect ratio above the range and a second aspect ratio below the range. Such an embodiment enables a device to have more granular control over each user interface arrangement used in each orientation.

Specifically, in response to determining that the display screen 101 is in the portrait orientation, one or more devices can cause a display of a first user interface arrangement 102A comprising individual renderings 103 of individual streams of the plurality of streams, wherein the individual renderings each have a first aspect ratio that is greater than a first target aspect ratio, or greater than the high end of the range.

Next, at operation 508, one or more computing modules can receive updated orientation data from the sensor mounted to the computing device. The orientation data can indicate that a display screen 101 of the computing device 100 is in a portrait orientation or in landscape orientation. As described in more detail below, with respect to FIG. 7, a sensor may include an accelerometer, a compass or any other device for detecting a physical orientation of a device, e.g., whether device is positioned in an upright position, e.g., a portrait orientation, or a sideways position, e.g., a landscape orientation.

Next, at operation 510, one or more computing modules can cause a display of a second user interface arrangement 102B comprising individual renderings 103 of individual streams of the plurality of streams. The individual renderings can each have a second aspect ratio that is less than the target aspect ratio in response to determining that the display screen 101 is in the landscape orientation. The individual renderings can each have a second aspect ratio that is less than the first aspect ratio in response to determining that the display screen 101 is in the landscape orientation.

For example, the individual renderings of the updated interface arrangement 102B can each be displayed using a second aspect ratio forming a portrait dimension, 5:7, which is less than a target aspect ratio, such as 1:1. It can be appreciated that other target aspect ratios may be selected to provide different outcomes with respect to each layout. In addition, a target aspect ratio may be selected based on a particular dimension of a screen, a model of a device, or other factors. Any target aspect ratio can be selected based on a desired outcome.

In operation 510, the individual renderings can each have a second aspect ratio that is less than the first aspect ratio in response to determining that the display screen 101 is in the landscape orientation. Thus, in some configurations, the aspect ratio for images displayed on a device in a portrait orientation can be 16:9. When the device is rotated to a landscape orientation, the aspect ratio for images displayed on the device can be less than 16:9, such as, but not limited to 4:3, 1:1, or 5:7.

In an embodiment where a range is used, in response to determining that the display screen 101 is in the landscape orientation, one or more devices can cause a display of the second user interface arrangement 102B comprising individual renderings 103 of individual streams of the plurality of streams, wherein the individual renderings each have a second aspect ratio that is less than a second target aspect ratio, or a second aspect ratio that is less than the low end of the range.

Next, at operation 512, one or more computing modules can analyze any user input for adjusting an aspect ratio of a rendering. For instance, if a user adjusts the size of a particular rendering after rotating the device, the system can analyze the input for modifying the target aspect ratio. Thus, the target aspect ratio can be modified over time to optimize a user interface arrangement for a particular user. The input data for configuring an aspect ratio of a rendering and any corresponding machine learning data can be stored on a per user and a per device basis. In addition, the input data for configuring an aspect ratio of a rendering and any corresponding machine learning data can be stored on a per event basis. Thus, a first target aspect ratio can be determined and stored for a portrait orientation of a device and a second target aspect ratio can be determined and stored for a landscape orientation of the device. Each iteration of the routine 500 can adjust a target aspect ratio for a device over time or switch between a single target aspect ratio and multiple target aspect ratios for device depending on a user's input patterns.

In one illustrative example, a device can start with a single target aspect ratio, e.g., a target aspect ratio of one (1:1). Then over time, if a user adjusts and aspect ratio while the devices in landscape orientation, e.g., the user prefers to widen each of the renderings, the device may transition to a mode where it uses two target aspect ratios, e.g., the original target aspect ratio for the device while the device is held in a portrait orientation, and a second target aspect ratio for the device while it is held in a landscape orientation.

In one illustrative example, a device can receive a user input to adjust the first aspect ratio while the device is in the portrait orientation. A user can adjust the aspect ratio for the device while it is held in a portrait orientation, where the user input can increase and aspect ratio of one of the renderings. When the user increases the aspect ratio for one rendering, the device can increase the aspect ratio for each of the other renderings such that each rendering (103A-103D) has an equal aspect ratio based on the user input. In response to the input, the device can generate usage data defining an adjusted target aspect ratio that is based on the input for adjusting the first aspect ratio. The adjusted target aspect ratio can be greater than the target aspect ratio if the user input increases the first aspect ratio of the first user interface arrangement. The adjusted target aspect ratio can also be less than the target aspect ratio if the user decreases the first aspect ratio of the first user interface arrangement. The device can then store the adjusted target aspect ratio causing subsequent executions of the method to set the first aspect ratio to be greater than the adjusted target aspect ratio. For illustrative purposes, aspect ratios are deemed to be greater or less than one another. Such comparisons can be based on each number of an aspect ratio to be respectively a numerator and a denominator of a fraction to driver a value. For example, an aspect ratio of 4:3 has a value of 1.33 which is greater than an aspect ratio of 1:1 having a value of 1.00.

In another illustrative example, a device can receive a user input to adjust the second aspect ratio while the device is in the landscape orientation. The device can then generate usage data defining an adjusted target aspect ratio that is based on the input for adjusting the second aspect ratio. The adjusted target aspect ratio can be greater than the target aspect ratio if the user input increases the second aspect ratio, or the adjusted target aspect ratio can be less than the target aspect ratio if the user input decreases the second aspect ratio, e.g., makes each rendering more narrow. Similar to the example above, if the user adjusts the aspect ratio of one rendering, the device can adjust the aspect ratio for each of the renderings so that each of the renderings have an equal aspect ratio based on the input. The device can then store the adjusted target aspect ratio causing subsequent uses of the device to set the second aspect ratio to a value less than the adjusted target aspect ratio.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 7:
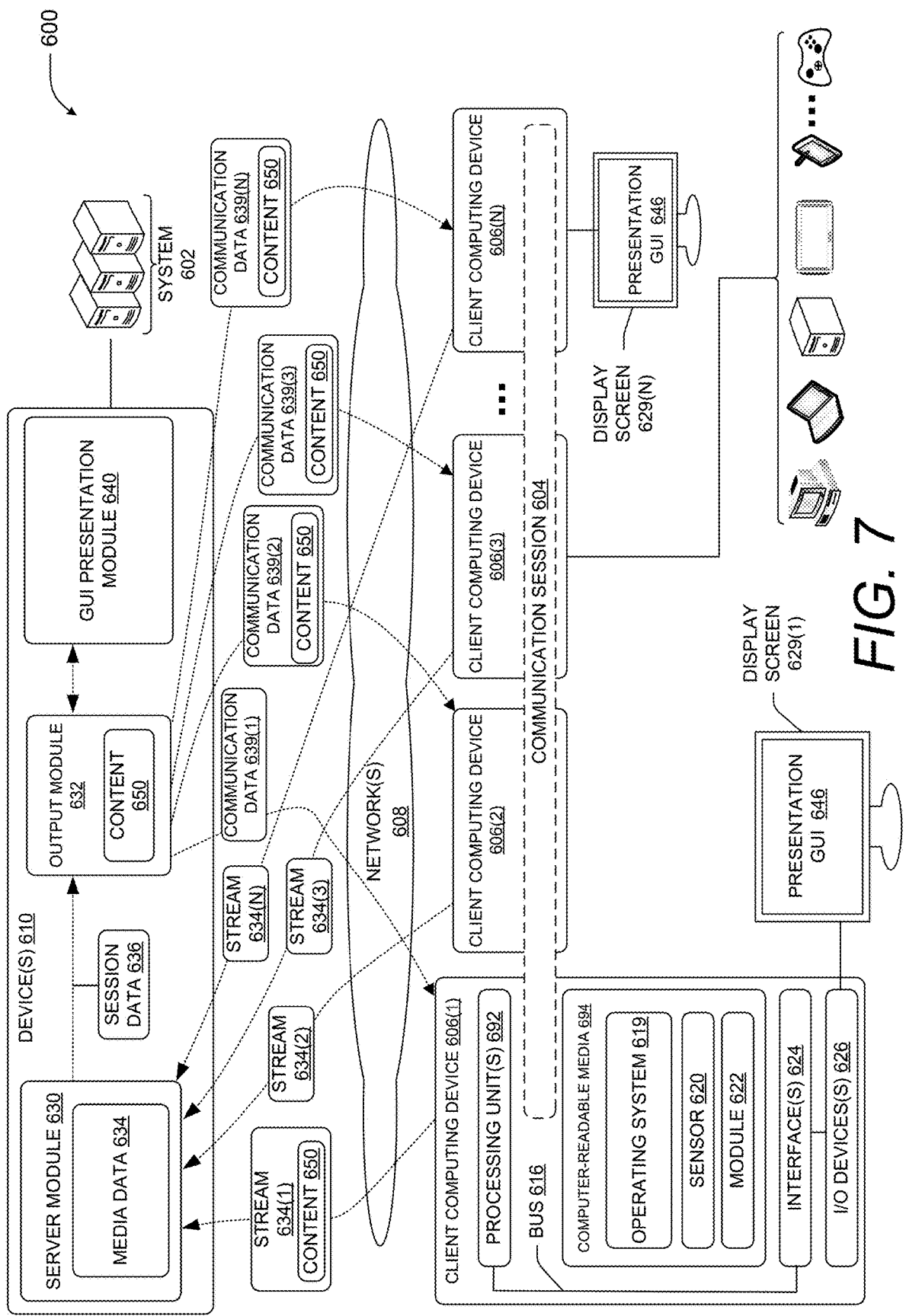
FIG. 7 is a computing system diagram showing aspects of an illustrative operating environment for the technologies disclosed herein.

FIG. 7 is a diagram illustrating an example environment 600 in which a system 602 can implement the techniques disclosed herein. In some implementations, a system 602 may function to collect, analyze, and share data defining one or more objects that are displayed to users of a communication session 604.

As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 6 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s)

610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a sensor 620, a module 622, and other modules, programs, or applications that are loadable and executable by data processing units(s) 692. The sensor 620 can be an accelerometer, a compass, or any other solid state device that can detect an orientation, acceleration or location of a device.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 6 illustrates that client computing device 606(1) is in some way connected to a display device (e.g., a display screen 629(N)), which can display a UI according to the techniques described herein.

In the example environment 600 of FIG. 7, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective modules 622 to generate participant profiles (not shown in FIG. 7) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 7, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such a image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include module 622, which can also be referred to here as a GUI module. The GUI module 622 may be configured to analyze communication data 639 that is for delivery to one or more of the client computing devices 606. Specifically, the UI module 622, at the device(s) 610 and/or the client computing device 606, may analyze communication data 639 to determine an appropriate manner for displaying video, image, and/or content on the display screen 629 of an associated client computing device 606. In some implementations, the GUI module 622 may provide video, image, and/or content to a presentation GUI 646 rendered on the display screen 629 of the associated client computing device 606. The presentation GUI 646 may be caused to be rendered on the display screen 629 by the GUI module 622. The presentation GUI 646 may include the video, image, and/or content analyzed by the GUI module 622.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI module 622 may populate the first and second sections of the presentation GUI 646 in a manner that properly imitates an environment experience that the presenter and the individual may be sharing.

In some implementations, the GUI module 622 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different than the general communication session.

Figure 8:
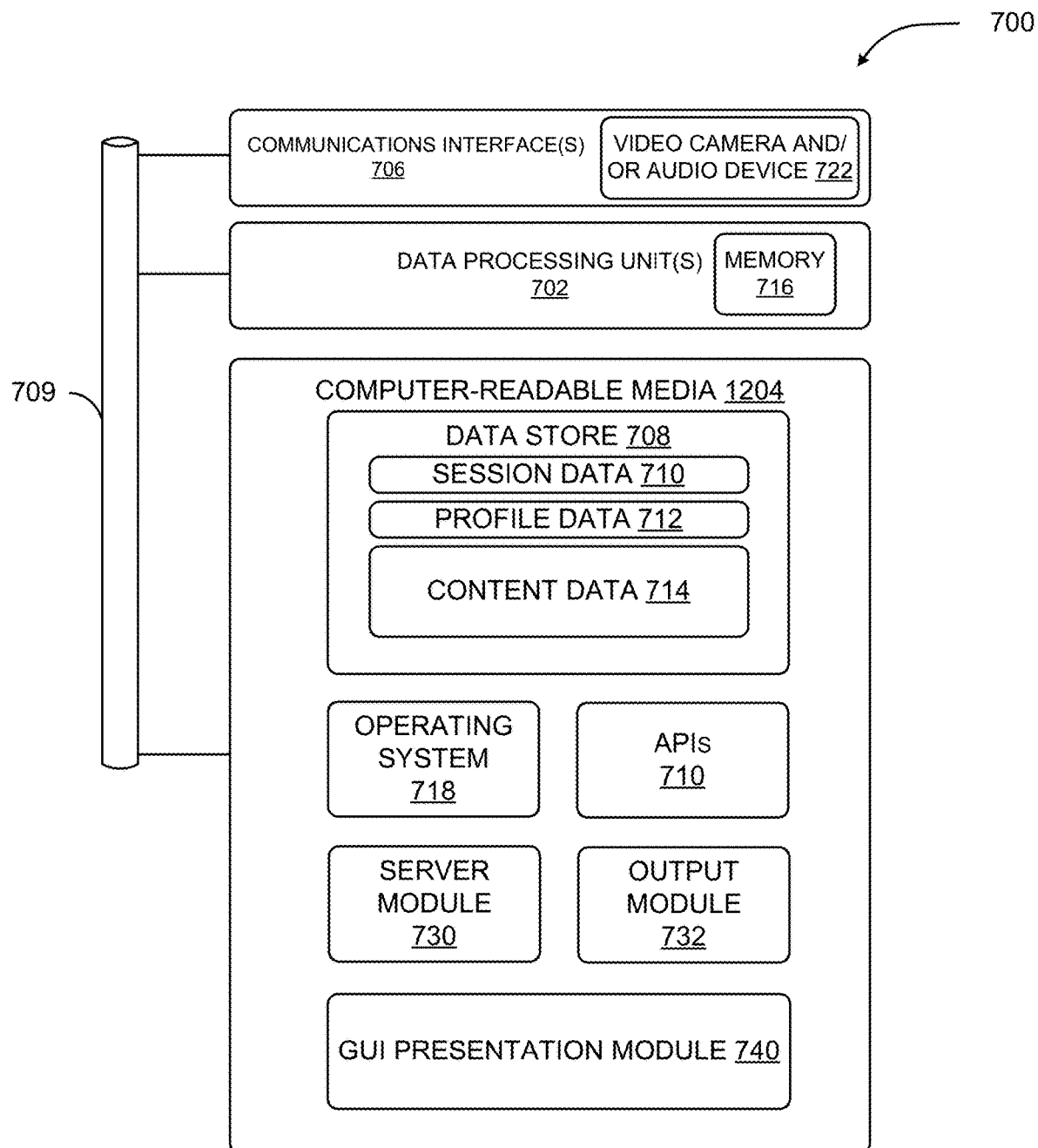
FIG. 8 is a computing architecture diagram showing aspects of the configuration and operation of a computing device that can implement aspects of the technologies disclosed herein.

FIG. 8 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710, profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include content data 714, such as the content that includes video, audio, or other content for rendering and display on one or more of the display screens 629.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary higher or lower. That is, functionality described herein in association with the illustrated modules may be performed by a fewer number of modules or a larger number of modules on one device or spread across multiple devices.

The disclosure presented herein also encompasses the subject matter set forth in the following clauses.

Clause A: A method performed by a computing system 100, the method comprising: receiving a plurality of streams, individual streams of the plurality of streams comprising a video component; receiving orientation data from a sensor mounted to the computing system 100, the orientation data indicating that a display screen 101 of the computing system 100 is in a portrait orientation; in response to determining that the display screen 101 is in the portrait orientation, causing a display of a first user interface arrangement 102A comprising individual renderings 103 of individual streams of the plurality of streams, wherein the individual renderings each have a first aspect ratio that is greater than a target aspect ratio; receiving additional orientation data from the sensor, the additional orientation data indicating that the display screen 101 transitioned from the portrait orientation to a landscape orientation; and in response to determining that the display screen 101 transitioned from the portrait orientation to the landscape orientation, causing a transition from the first user interface arrangement 102A to a display of a second user interface arrangement 102B comprising updated renderings 103 of the individual streams, wherein the updated renderings 103 each have a second aspect ratio that is less than the target aspect ratio.

Clause B: The method of clause A, further comprising: analyzing the plurality of streams to determine that at least one stream of the plurality of streams depicts a threshold number of people; analyzing the at least one stream depicting the threshold number of people to identify at least one person associated with a threshold level of activity; and determining a scaling factor for generating a modified rendering of the at least one stream, the scaling factor of the modified rendering configured to bring focus to the at least one person associated with the threshold level of activity.

Clause C: The method of clauses A and B, further comprising: analyze the plurality of streams to determine that at least one stream of the plurality of streams depicts a threshold number of people; and selecting a fixed aspect ratio for the at least one stream, wherein the fixed aspect ratio overrides an association with the second aspect ratio and the second aspect ratio, wherein a rendering of the at least one stream is displayed using the fixed aspect ratio when the display screen is in the portrait orientation or the landscape orientation.

Clause D: The method of clauses A through C, further comprising: analyzing the plurality of streams to determine a number of people depicted in the video components of each stream; and configuring the first user interface arrangement or the second user interface arrangement to order individual renderings of each stream based on the number of people depicted in the video components of each stream.

Clause E: The method of clauses A through D, further comprising: analyzing the plurality of streams to determine a number of people depicted in the video components of each stream; configuring the first user interface arrangement or the second user interface arrangement to position a rendering of a first stream at one end of a sequence of renderings of the plurality of streams and position a rendering of a second stream at a second position of the sequence of renderings, wherein a number of people depicted in the first stream is greater than a number of people depicted in the second stream; analyzing the plurality of streams to determine if the number of people depicted in the first stream is less than the number of people depicted in the second stream; and in response to determining that the number of people depicted in the first stream is less than the number of people depicted in the second stream, configuring the first user interface arrangement or the second user interface arrangement to move the rendering of the second stream at one end of the sequence of renderings and position the rendering of the first stream at the second position of the sequence of renderings.

Clause F: The method of clauses A through E, wherein the target aspect ratio is selected based on one or more dimensions of a display device in communication with computing system, and wherein the target aspect ratio includes a range having a low ratio and a high ratio, wherein the first aspect ratio is greater than the high ratio of the range and the second aspect ratio is less than the low ratio of the range.

Clause G: The method of clauses A through F, further comprising: receiving a user input to adjust the first aspect ratio while the device is in the portrait orientation; generating usage data defining an adjusted target aspect ratio that is based on the input for adjusting the first aspect ratio, the adjusted target aspect ratio being greater than the target aspect ratio if the user input increases the first aspect ratio; and storing the adjusted target aspect ratio causing subsequent executions of the method to set the first aspect ratio to be greater than the adjusted target aspect ratio.

Clause H: The method of clauses A through G, further comprising: receiving a user input to adjust the second aspect ratio while the device is in the landscape orientation; generating usage data defining an adjusted target aspect ratio that is based on the input for adjusting the second aspect ratio, the adjusted target aspect ratio being greater than the target aspect ratio if the user input increases the second aspect ratio; and storing the adjusted target aspect ratio causing subsequent executions of the method to set the second aspect ratio to a value less than the adjusted target aspect ratio.

Clause I: A system 100, comprising: one or more processing 692 units; and a computer-readable medium 692 having encoded thereon computer-executable instructions to cause the one or more processing units 692 to: receive a plurality of streams, individual streams of the plurality of streams comprising a video component; receive orientation data from a sensor mounted to the computing system 100, the orientation data indicating that a display screen 101 of the computing system 100 is in a landscape orientation; in response to determining that the display screen 101 is in the landscape orientation, cause a display of a first user interface arrangement 102B comprising individual renderings 103' of individual streams of the plurality of streams, wherein the individual renderings each displayed using a first aspect ratio; receive additional orientation data from the sensor, the additional orientation data indicating that the display screen 101 transitioned from the landscape orientation to a portrait orientation; and in response to determining that the display screen 101 transitioned from the landscape orientation to the portrait orientation, cause a transition from the first user interface 102B arrangement to a display of a second user interface arrangement 102A comprising updated renderings 103 of the individual streams, wherein the updated renderings 103 are each displayed using a second aspect ratio that is greater than the first aspect ratio.

Clause J: The system of clause I, wherein the instructions further cause the one or more processing units to: analyze the plurality of streams to determine that at least one stream of the plurality of streams depicts a threshold number of people; analyze the at least one stream depicting the threshold number of people to identify at least one person associated with a threshold level of activity; and determine a scaling factor for generating a modified rendering of the at least one stream, the scaling factor of the modified rendering configured to bring focus to the at least one person associated with the threshold level of activity.

Clause K: The system of clauses I and J, wherein the instructions further cause the one or more processing units to: analyze the plurality of streams to determine that at least one stream of the plurality of streams depicts a threshold number of people; and selecting a fixed aspect ratio for the at least one stream, wherein the fixed aspect ratio overrides an association with the second aspect ratio and the second aspect ratio, wherein a rendering of the at least one stream is displayed using the fixed aspect ratio when the display screen is in the portrait orientation or the landscape orientation.

Clause L: The system of clauses I through K, wherein the instructions further cause the one or more processing units to: analyzing the plurality of streams to determine a number of people depicted in the video components of each stream; and configuring the first user interface arrangement or the second user interface arrangement to order individual renderings of each stream based on the number of people depicted in the video components of each stream.

Clause M: The system of clauses I through L, wherein the instructions further cause the one or more processing units to: analyzing the plurality of streams to determine a number of people depicted in the video components of each stream; configuring the first user interface arrangement or the second user interface arrangement to position a rendering of a first stream at one end of a sequence of renderings of the plurality of streams and position a rendering of a second stream at a second position of the sequence of renderings, wherein a number of people depicted in the first stream is greater than a number of people depicted in the second stream; analyzing the plurality of streams to determine if the number of people depicted in the first stream is less than the number of people depicted in the second stream; and in response to determining that the number of people depicted in the first stream is less than the number of people depicted in the second stream, configuring the first user interface arrangement or the second user interface arrangement to move the rendering of the second stream at one end of the sequence of renderings and position the rendering of the first stream at the second position of the sequence of renderings.

Clause N: A system 110, comprising: means for receiving a plurality of streams, individual streams of the plurality of streams comprising a video component; means for receiving orientation data from a sensor mounted to the computing system 100, the orientation data indicating that a display screen 101 of the computing system 100 is in a portrait orientation; means for causing a display of a first user interface arrangement 102A comprising individual renderings 103 of individual streams of the plurality of streams, in response to determining that the display screen 101 is in the portrait orientation, wherein the individual renderings each have a first aspect ratio that is greater than a target aspect ratio; means for receiving additional orientation data from the sensor, the additional orientation data indicating that the display screen 101 transitioned from the portrait orientation to a landscape orientation; and means for causing a transition from the first user interface arrangement 102A to a display of a second user interface arrangement 102B comprising updated renderings 103' of the individual streams, in response to determining that the display screen 101 transitioned from the portrait orientation to the landscape orientation, wherein the updated renderings 103 each have a second aspect ratio that is less than the target aspect ratio.

Clause O: The system of clause N, further comprising: means for analyzing the plurality of streams to determine that at least one stream of the plurality of streams depicts a threshold number of people; means for analyzing the at least one stream depicting the threshold number of people to identify at least one person associated with a threshold level of activity; and means for determining a scaling factor suitable for generating a modified rendering of the at least one stream, the scaling factor of the modified rendering configured to bring focus to the at least one person associated with the threshold level of activity.

Clause P: The system of clauses N and O, further comprising: means for analyze the plurality of streams to determine that at least one stream of the plurality of streams depicts a threshold number of people; and means for selecting a fixed aspect ratio for the at least one stream, wherein the fixed aspect ratio overrides an association with the second aspect ratio and the second aspect ratio, wherein a rendering of the at least one stream is displayed using the fixed aspect ratio when the display screen is in the portrait orientation or the landscape orientation.

Clause Q: The system of clauses N through P, further comprising: means for analyzing the plurality of streams to determine a number of people depicted in the video components of each stream; and means for configuring the first user interface arrangement or the second user interface arrangement to order individual renderings of each stream based on the number of people depicted in the video components of each stream.

Clause R: The system of clauses N through Q, further comprising: means for analyzing the plurality of streams to determine a number of people depicted in the video components of each stream; means for configuring the first user interface arrangement or the second user interface arrangement to position a rendering of a first stream at one end of a sequence of renderings of the plurality of streams and position a rendering of a second stream at a second position of the sequence of renderings, wherein a number of people depicted in the first stream is greater than a number of people depicted in the second stream; means for analyzing the plurality of streams to determine if the number of people depicted in the first stream is less than the number of people depicted in the second stream; and means for configuring the first user interface arrangement or the second user interface arrangement to move the rendering of the second stream at one end of the sequence of renderings and position the rendering of the first stream at the second position of the sequence of renderings, in response to determining that the number of people depicted in the first stream is less than the number of people depicted in the second stream.

Clause S: The system of clauses N through R, further comprising: means for receiving a user input to adjust the first aspect ratio while the device is in the portrait orientation; means for generating usage data defining an adjusted target aspect ratio that is based on the input for adjusting the first aspect ratio, the adjusted target aspect ratio being greater than the target aspect ratio if the user input increases the first aspect ratio; and means for storing the adjusted target aspect ratio causing subsequent executions of the method to set the first aspect ratio to be greater than the adjusted target aspect ratio.

Clause T: The system of clauses N through S, further comprising: means for receiving a user input to adjust the second aspect ratio while the device is in the landscape orientation; means for generating usage data defining an adjusted target aspect ratio that is based on the input for adjusting the second aspect ratio, the adjusted target aspect ratio being greater than the target aspect ratio if the user input increases the second aspect ratio; and means for storing the adjusted target aspect ratio causing subsequent executions of the method to set the second aspect ratio to a value less than the adjusted target aspect ratio.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method performed by a computing system, the method comprising:
   receiving a plurality of streams, individual streams of the plurality of streams comprising a video component;
   receiving orientation data from a sensor mounted to the computing system, the orientation data indicating that a display screen of the computing system is in a portrait orientation;
   in response to determining that the display screen is in the portrait orientation, causing a display of a first user interface arrangement comprising individual renderings of individual streams of the plurality of streams, wherein the individual renderings each have a first aspect ratio that is greater than a target aspect ratio;
   receiving additional orientation data from the sensor, the additional orientation data indicating that the display screen transitioned from the portrait orientation to a landscape orientation; and
   in response to determining that the display screen transitioned from the portrait orientation to the landscape orientation, causing a transition from the first user interface arrangement to a display of a second user interface arrangement comprising updated renderings of the individual streams, wherein the updated renderings each have a second aspect ratio that is less than the target aspect ratio.

2. The method of claim 1, further comprising:
   analyzing the plurality of streams to determine that at least one stream of the plurality of streams depicts a threshold number of people;
   analyzing the at least one stream depicting the threshold number of people to identify at least one person associated with a threshold level of activity; and
   determining a scaling factor for generating a modified rendering of the at least one stream, the scaling factor of the modified rendering configured to bring focus to the at least one person associated with the threshold level of activity.

3. The method of claim 1, further comprising:
   analyzing the plurality of streams to determine that at least one stream of the plurality of streams depicts a threshold number of people; and
   selecting a fixed aspect ratio for the at least one stream, wherein the fixed aspect ratio overrides an association with the first aspect ratio and the second aspect ratio, wherein a rendering of the at least one stream is displayed using the fixed aspect ratio when the display screen is in the portrait orientation or the landscape orientation.

4. The method of claim 1, further comprising:
   analyzing the plurality of streams to determine a number of people depicted in the video components of each stream; and
   configuring the first user interface arrangement or the second user interface arrangement to order individual renderings of each stream based on the number of people depicted in the video components of each stream.

5. The method of claim 1, further comprising:
analyzing the plurality of streams to determine a number of people depicted in the video components of each stream;
configuring the first user interface arrangement or the second user interface arrangement to position a rendering of a first stream at one end of a sequence of renderings of the plurality of streams and position a rendering of a second stream at a second position of the sequence of renderings, wherein a number of people depicted in the first stream is greater than a number of people depicted in the second stream;
analyzing the plurality of streams to determine if the number of people depicted in the first stream is less than the number of people depicted in the second stream; and
in response to determining that the number of people depicted in the first stream is less than the number of people depicted in the second stream, configuring the first user interface arrangement or the second user interface to move the rendering of the second stream at one end of the sequence of renderings and position the rendering of the first stream at the second position of the sequence of renderings.

6. The method of claim 1, wherein the target aspect ratio is selected based on one or more dimensions of a display device in communication with the computing system, and wherein the target aspect ratio includes a range having a low ratio and a high ratio, wherein the first aspect ratio is greater than the high ratio of the range and the second aspect ratio is less than the low ratio of the range.

7. The method of claim 1, further comprising:
receiving a user input to adjust the first aspect ratio while the device is in the portrait orientation;
generating usage data defining an adjusted target aspect ratio that is based on the input for adjusting the first aspect ratio, the adjusted target aspect ratio being greater than the target aspect ratio if the user input increases the first aspect ratio; and
storing the adjusted target aspect ratio causing subsequent executions of the method to set the first aspect ratio to be greater than the adjusted target aspect ratio.

8. The method of claim 1, further comprising:
receiving a user input to adjust the second aspect ratio while the device is in the landscape orientation;
generating usage data defining an adjusted target aspect ratio that is based on the input for adjusting the second aspect ratio, the adjusted target aspect ratio being greater than the target aspect ratio if the user input increases the second aspect ratio; and
storing the adjusted target aspect ratio causing subsequent executions of the method to set the second aspect ratio to a value less than the adjusted target aspect ratio.

9. A system, comprising:
one or more processing units; and
a computer storage media having encoded thereon computer-executable instructions to cause the one or more processing units to:
receive a plurality of streams, individual streams of the plurality of streams comprising a video component;
receive orientation data from a sensor mounted to the computing system, the orientation data indicating that a display screen of the computing system is in a landscape orientation;

in response to determining that the display screen is in the landscape orientation, cause a display of a first user interface arrangement comprising individual renderings of individual streams of the plurality of streams, wherein the individual renderings are each displayed using a first aspect ratio;
receive additional orientation data from the sensor, the additional orientation data indicating that the display screen transitioned from the landscape orientation to a portrait orientation; and
in response to determining that the display screen transitioned from the landscape orientation to the portrait orientation, cause a transition from the first user interface arrangement to a display of a second user interface arrangement comprising updated renderings of the individual streams, wherein the updated renderings are each displayed using a second aspect ratio that is greater than the first aspect ratio.

10. The system of claim 9, wherein the instructions further cause the one or more processing units to:
analyze the plurality of streams to determine that at least one stream of the plurality of streams depicts a threshold number of people;
analyze the at least one stream depicting the threshold number of people to identify at least one person associated with a threshold level of activity; and
determine a scaling factor for generating a modified rendering of the at least one stream, the scaling factor of the modified rendering configured to bring focus to the at least one person associated with the threshold level of activity.

11. The system of claim 9, wherein the instructions further cause the one or more processing units to:
analyze the plurality of streams to determine a number of people depicted in the video components of each stream;
configure the first user interface arrangement or the second user interface arrangement to position a rendering of a first stream at one end of a sequence of renderings of the plurality of streams and position a rendering of a second stream at a second position of the sequence of renderings, wherein a number of people depicted in the first stream is greater than a number of people depicted in the second stream;
analyze the plurality of streams to determine if the number of people depicted in the first stream is less than the number of people depicted in the second stream; and
in response to determining that the number of people depicted in the first stream is less than the number of people depicted in the second stream, configure the first user interface arrangement or the second user interface arrangement to move the rendering of the second stream at one end of the sequence of renderings and position the rendering of the first stream at the second position of the sequence of renderings.

12. The system of claim 9, wherein the individual renderings of the first user interface arrangement each have the first aspect ratio that is less than a target aspect ratio, wherein the individual renderings of the second user interface arrangement each have the second aspect ratio that is greater than the target aspect ratio.

13. The system of claim 9, wherein the first aspect ratio is less than a target aspect ratio, wherein the second aspect ratio is greater than the target aspect ratio.

14. A system, comprising:
means for receiving a plurality of streams, individual streams of the plurality of streams comprising a video component;
means for receiving orientation data from a sensor mounted to the computing system, the orientation data indicating that a display screen of the computing system is in a portrait orientation;
means for causing a display of a first user interface arrangement comprising individual renderings of individual streams of the plurality of streams, in response to determining that the display screen is in the portrait orientation, wherein the individual renderings each have a first aspect ratio that is greater than a target aspect ratio;
means for receiving additional orientation data from the sensor, the additional orientation data indicating that the display screen transitioned from the portrait orientation to a landscape orientation; and
means for causing a transition from the first user interface arrangement to a display of a second user interface arrangement comprising updated renderings of the individual streams, in response to determining that the display screen transitioned from the portrait orientation to the landscape orientation, wherein the updated renderings each have a second aspect ratio that is less than the target aspect ratio.

15. The system of claim 14, further comprising:
means for analyzing the plurality of streams to determine that at least one stream of the plurality of streams depicts a threshold number of people;
means for analyzing the at least one stream depicting the threshold number of people to identify at least one person associated with a threshold level of activity; and
means for determining a scaling factor suitable for generating a modified rendering of the at least one stream, the scaling factor of the modified rendering configured to bring focus to the at least one person associated with the threshold level of activity.

16. The system of claim 14, further comprising:
means for analyzing the plurality of streams to determine that at least one stream of the plurality of streams depicts a threshold number of people; and
means for selecting a fixed aspect ratio for the at least one stream, wherein the fixed aspect ratio overrides an association with the second aspect ratio and the second aspect ratio, wherein a rendering of the at least one stream is displayed using the fixed aspect ratio when the display screen is in the portrait orientation or the landscape orientation.

17. The system of claim 14, further comprising:
means for analyzing the plurality of streams to determine a number of people depicted in the video components of each stream; and
means for configuring the first user interface arrangement or the second user interface arrangement to order individual renderings of each stream based on the number of people depicted in the video components of each stream.

18. The system of claim 14, further comprising:
means for analyzing the plurality of streams to determine a number of people depicted in the video components of each stream;
means for configuring the first user interface arrangement or the second user interface arrangement to position a rendering of a first stream at one end of a sequence of renderings of the plurality of streams and position a rendering of a second stream at a second position of the sequence of renderings, wherein a number of people depicted in the first stream is greater than a number of people depicted in the second stream;
means for analyzing the plurality of streams to determine if the number of people depicted in the first stream is less than the number of people depicted in the second stream; and
means for configuring the first user interface arrangement or the second user interface arrangement to move the rendering of the second stream at one end of the sequence of renderings and position the rendering of the first stream at the second position of the sequence of renderings, in response to determining that the number of people depicted in the first stream is less than the number of people depicted in the second stream.

19. The system of claim 14, further comprising:
means for receiving a user input to adjust the first aspect ratio while the device is in the portrait orientation;
means for generating usage data defining an adjusted target aspect ratio that is based on the input for adjusting the first aspect ratio, the adjusted target aspect ratio being greater than the target aspect ratio if the user input increases the first aspect ratio; and
means for storing the adjusted target aspect ratio causing subsequent executions of the method to set the first aspect ratio to be greater than the adjusted target aspect ratio.

20. The system of claim 14, further comprising:
means for receiving a user input to adjust the second aspect ratio while the device is in the landscape orientation;
means for generating usage data defining an adjusted target aspect ratio that is based on the input for adjusting the second aspect ratio, the adjusted target aspect ratio being greater than the target aspect ratio if the user input increases the second aspect ratio; and
means for storing the adjusted target aspect ratio causing subsequent executions of the method to set the second aspect ratio to a value less than the adjusted target aspect ratio.

* * * * *